Patented Mar. 14, 1944

2,344,459

UNITED STATES PATENT OFFICE 2,344,459

METHOD OF PREPARING 1-(SUBSTITUTED ALKYL)-5,5-DISUBSTITUTED BARBITURIC COMPOUNDS

Henry R. Henze, Austin, Tex., assignor to Eli Lilly and Company, Indianapolis, Ind., a corporation of Indiana No Drawing. Application March 21, 1941, Serial No. 384,590

1 Claim. (Cl. 260—257)

This invention relates to barbituric compounds and more particularly to 1-(substituted alkyl)-5,5-disubstituted barbituric compounds and to the methods of preparing these compounds.

The compounds of this invention may be represented by the following formula:

(1)
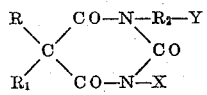

in which R is selected from the class which consists of the phenyl group, primary alkyl groups having from 2 to 5 carbon atoms, such as the n-propyl, n-butyl, and n-amyl groups, and secondary alkyl groups having from 3 to 5 carbon atoms, such as the isopropyl, 1-methylpropyl, and 1-methylbutyl groups, $R_1$ is selected from the class consisting of allyl and ethyl groups, $R_2$ is a lower alkyl group having, attached to a carbon atom other than the carbon atom attached to the nitrogen atom, a substituent Y which is selected from the class which consists of hydroxyl, chlorine, and bromine, and X is a member selected from the class which consists of hydrogen, the alkaline metals, the equivalents of the alkaline-earth metals, ammonium, monoalkyl ammonium, dialkyl ammonium, and alkanol ammonium.

The method of preparing the compounds in accordance with this invention is as follows:

A sodium 5-R-5-$R_1$ barbiturate having the following formula:

(2)
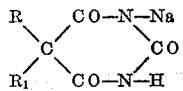

is treated with one molecular equivalent of a chloroalkanol having the following formula:

(3)  Cl—$R_2$—OH
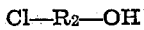

A solvent, such as methanol, may be employed in this reaction. The reaction mixture is heated for a period of approximately 2 hours, during which time the 1-(hydroxyalkyl)-5-R-5-$R_1$ barbituric compound is formed. The reaction which takes place may be represented by the following equation:

(4)
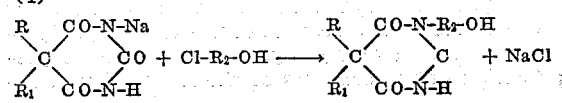

The sodium chloride formed is removed from the reaction mixture by any suitable means, such as filtration, and any unreacted chloroalkanol may be separated by any convenient means, such as distillation. The desired product may be purified by recrystallization in a suitable solvent.

The 1-(hydroxyalkyl)-5-R-5-$R_1$ barbituric compound formed is converted to the corresponding chloro or bromo compound by treatment with phosphorus pentachloride, phosphorus pentabromide, phosphorus trichloride, or phosphorus tribromide. For example, the corresponding chloro compound is prepared by treating the 1-(hydroxyalkyl)-5-R-5-$R_1$ barbituric compound with phosphorus pentachloride. The reaction is exothermic in nature, and hydrogen chloride is evolved. The reaction which takes place may be represented by the following equation:

(5)
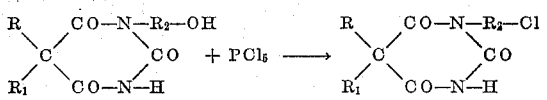

The 1-(chloroalkyl)-5-R-5-$R_1$ barbituric compound formed is ordinarily insoluble and may be recovered by filtration. Desirably it is washed with water and recrystallized in a suitable solvent, such as dilute alcohol.

The corresponding bromo compound, 1-(bromoalkyl)-5,5'-disubstituted barbituric compound, is prepared in exactly the same manner except that phosphorus tribromide or phosphorus pentabromide is employed instead of the phosphorus pentachloride described.

Salts of the 1-(hydroxyalkyl)-5-R-5-$R_1$ barbituric compound, the 1-(chloroalkyl)-5-R-5-$R_1$ barbituric compound, and the 1-(bromoalkyl)-5-R-5-$R_1$ barbituric compound are prepared by treating any of these compounds with the required base, such as sodium, potassium or ammonium hydroxides, or necessary organic base. For example, the sodium salt is produced by treating one mole of the compound dissolved in a suitable solvent with one mole of sodium hydroxide. The sodium salt of these compounds is represented generically by the formula:

(6)
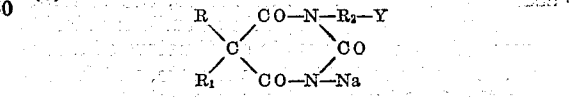

Typical examples of the preparation of compositions in accordance with this invention are as follows:

EXAMPLE 1.—*Preparation of 1-(β-hydroxyethyl)-5-ethyl-5-phenyl barbituric acid*

Twenty-five and four tenths grams (0.1 mole) of sodium 5-ethyl-5-phenyl barbiturate are dried for three hours at 140° C., placed in a 200 cc. flask fitted with stirrer and reflux condenser. 100 cc. of redistilled ethylene chlorohydrin (B. P. 128°–129° C.) are added and the mixture heated to boiling while being stirred. As the material in the flask becomes warm, the salt gradually goes into solution and sodium chloride separates from solution. At the end of two hours, heating is discontinued. During this time the desired 1-(β-hydroxyethyl)-5-ethyl-5-phenyl barbituric acid is formed. The contents of the flask are cooled and filtered, and the precipitate washed with 25 cc. of ethyl ether. The residue of sodium chloride weighs about 5.75 g.

The filtrate, which contains the 1-(β-hydroxyethyl)-5-ethyl-5-phenyl barbituric acid, is placed in a 250 cc. distilling flask and the excess ethylene chlorohydrin distilled off under reduced pressure, heat being supplied by a water bath. The clear residual gummy material is dissolved in 100 cc. of benzene and the solution allowed to stand for three days, during which time crystallization slowly occurs. The mixture is filtered, the fine white precipitate, which is the 1-(β-hydroxyethyl)-5-ethyl-5-phenyl barbituric acid, removed from the funnel, thoroughly mixed with 50 cc. of benzene, filtered and dried. Approximately 18.5 g. of product, melting at about 125°–135° C., are obtained. Recrystallization from alcohol-water or from benzene does not markedly purify this material. The dry product is shaken with three 50 cc. portions of ether and filtered after each addition. The residue from the ether washing weighs 12.7 g. and melts at 142°–145° C. After purification by additional crystallizations from dilute alcohol, the compond melts at about 145°–145.5° C., corrected, and may be represented by the following formula:

(7)

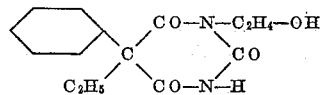

The yield, based on the net amount of 5-ethyl-5-phenyl barbituric acid involved, is about 60 percent of the theoretical. Analysis reveals 60.85 percent carbon and 5.89 percent hydrogen compared with theoretical values of 60.86 percent carbon and 5.84 percent hydrogen.

EXAMPLE 2.—*Preparation of 1-(β-hydroxyethyl)-5-ethyl-5-phenyl barbituric acid by an alternate method*

Twenty-five and four tenths grams (0.1 mole) of dried sodium 5-ethyl-5-phenyl barbiturate are dissolved in 100 cc. of anhydrous methanol, 12.1 g. (0.15 mole) of redistilled ethylene chlorohydrin are added, the solution placed in a small metal autoclave and heated for 40 hours at 110° C. During this time the 1-(β-hydroxyethyl-5-ethyl-5-phenyl barbituric acid is formed. After cooling and opening the autoclave, the contents is filtered and the precipitate of sodium chloride is washed wtih a few cubic centimeters of methanol. About one-half of the filtrate, which contains the 1-(β-hydroxyethyl)-5-ethyl-5-phenyl barbituric acid, is evaporated and 100 cc. of water are added, causing the precipitation of a clear transparent gum. The latter is heated with two 100 cc. portions of water, the mixture being cooled and the water decanted from the gum in each instance. The residual gum partially crystallizes after standing for one week, and this material is triturated with 50 cc. portions of benzene at room temperature until the crystalline material is no longer gummy. After filtering and drying, about 9.5 g. of the somewhat impure 1-(β-hydroxyethyl)-5-ethyl-5-phenyl barbituric acid, melting at about 130°–137° C., is obtained. While this method operates satisfactorily, it is preferred to prepare this composition by means of the method outlined in Example 1.

EXAMPLE 3.—*Preparation of 1-(β-bromoethyl)-5-ethyl-5-phenyl barbituric acid*

Three grams (0.01087 mole) of 1-(β-hydroxyethyl)-5-ethyl-5-phenyl barbituric acid are placed in a 50 cc. flask, 4.4 g. (0.0163 mole) of phosphorus tribromide are added, and the mixture heated at 110° C. in an oil bath for ten minutes. Vigorous evolution of fumes of hydrogen bromide occurs and a clear, slightly colored solution results. During this time 1-(β-bromoethyl)-5-ethyl-5-phenyl barbituric acid is formed. The flask is cooled slightly and the contents, while still liquid, are poured into 50 cc. of alcohol. The flask is rinsed with a few cubic centimeters of alcohol, the washings added to the main portion of solution and the latter concentrated to about 20 cc. on a steam cone. When 40 cc. of water are added and the mixture allowed to stand, a heavy oily liquid separates at first. This oily liquid, which contains the 1-(β-bromoethyl)-5-ethyl-5-phenyl barbituric acid, subsequently solidifies and some additional crystallization takes place. The mixture is filtered and the residue contains the 1-(β-bromoethyl)-5-ethyl-5-phenyl barbituric acid. This impure residue has a melting point of about 112°–113° C. The impure 1-(β-bromoethyl)-5-ethyl-5-phenyl barbituric acid is boiled with four 50 cc. portions of ligroin and the hot solutions are decanted. The residue consists of about 0.54 g. of 1-(β-hydroxyethyl)-5-ethyl-5-phenyl barbituric acid, while from the petroleum ether extract are obtained about 1.45 g. of the 1-(β-bromoethyl)-5-ethyl-5-phenyl barbituric acid. After recrystallization from petroleum ether and diluted alcohol, the 1-(β-bromoethyl)-5-ethyl-5-phenyl barbituric acid which is obtained melts at about 127.5°–128.5° C., corrected. It may be represented by the following formula:

(8)

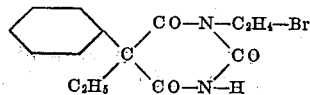

Analysis reveals 22.95 percent bromine and 8.28 percent nitrogen compared with theoretical values of 23.56 percent bromine and 8.26 percent nitrogen.

EXAMPLE 4.—*Preparation of 1-(β-chloroethyl)-5-ethyl-5-phenyl barbituric acid*

Three grams (0.01087 mole) of 1-(β-hydroxyethyl)-5-ethyl-5-phenyl barbituric acid are placed in a 50 cc. flask with 2.7 g. (0.01295) of phosphorus pentachloride. The mixture is warmed slightly on a steam cone, causing a vigorous evolution of hydrogen chloride with liquefication of the contents of the flask. The heating is continued for a few minutes after evolution of the gas has ceased. During this time the 1-(β-chloroethyl)-5-ethyl-5-phenyl barbituric acid is formed. The contents of the flask, while still liquid, is poured on about 60 g. of cracked ice. No visible sign of reaction is observed, and after the ice melts the desired product remains as an oil which later solidifies. The material is crushed with a stirring rod, filtered, washed with a few cubic centimeters of water and allowed to dry at room temperature. 2.97 g. of white crystalline material, melting at 103°–107° C., are obtained. After recrystallization from ligroin and from diluted alcohol, the 1-(β-chloroethyl)-5-ethyl-5-phenyl barbituric acid, melting at 112.5°–113.5° C., corrected, is obtained. This compound is represented by the following formula:

(9)

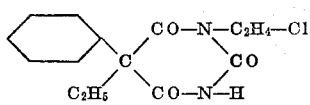

This amount represents a yield of 69 percent of the theoretical. Analysis reveals 11.95 percent chlorine and 9.50 percent nitrogen compared with theoretical values of 12.03 percent chlorine and 9.51 percent nitrogen.

Other 1-(hydroxyalkyl)-5-ethyl-5-phenyl barbituric compounds are prepared by employing the required chloroalkanol and proceeding in the manner described in Examples 1 or 2. For example, a propylene chlorohydrin or a butylene chlorohydrin may be used instead of ethylene chlorohydrin. After the 1-(hydroxyalkyl)-5-ethyl-5-phenyl barbituric compounds have been prepared, the corresponding 1-(bromoalkyl) or 1-(chloroalkyl)-5-ethyl-5-phenyl barbituric compounds may be produced by the methods described in Example 3 or 4. Likewise, if there is desired a 1-(hydroxyalkyl), 1-(bromoalkyl), or 1-(chloroalkyl)-5-R-5-$R_1$ barbituric compound other than when R is ethyl and $R_1$ is phenyl, the corresponding sodium 5-R-5-$R_1$ barbiturate is employed as the starting material instead of sodium 5-ethyl-5-phenyl barbiturate. For example, sodium 5-isoamyl-5-ethyl barbiturate, sodium 5-allyl-5-(1-methylbutyl) barbiturate, or sodium 5-ethyl-5-(1-methylbutyl) barbiturate may be used instead of sodium 5-ethyl-5-phenyl barbiturate employed in Example 1 or 2.

What is claimed is:

The method of preparing a 1-(substituted alkyl)-5,5-disubstituted barbituric compound which comprises reacting a sodium 5-R-5-$R_1$ barbiturate having the following formula:

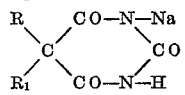

in which R is selected from the class which consists of the phenyl group, primary alkyl groups having from 2 to 5 carbon atoms, and secondary alkyl groups having from 3 to 5 carbon atoms, and $R_1$ is selected from the class which consists of allyl and ethyl groups with a chloroalkanol having the following formula:

$$Cl-R_2-OH$$

in which $R_2$ is a lower alkyl group.

HENRY R. HENZE.